Figure 1:
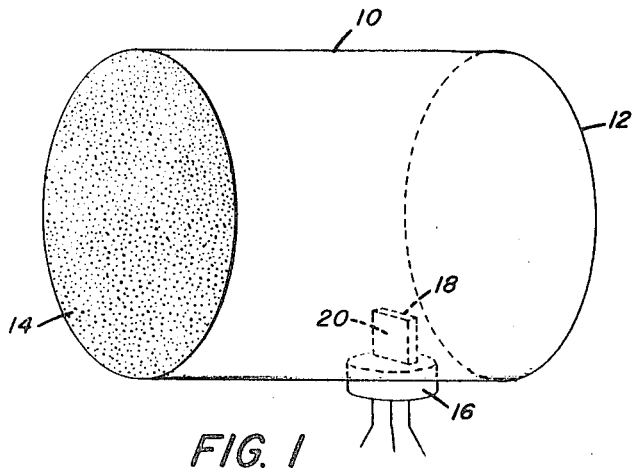

Jan. 24, 1967     O. T. CASEBEER     3,300,646
LIGHT INTEGRATOR USING DIFFUSE SURFACE
OF A LIGHT-CONDUCTING ROD
Filed Feb. 6, 1964

ORAN T. CASEBEER
INVENTOR.

BY

ATTORNEYS

United States Patent Office 3,300,646
Patented Jan. 24, 1967

3,300,646
LIGHT INTEGRATOR USING DIFFUSE SURFACE OF A LIGHT-CONDUCTING ROD
Oran T. Casebeer, Rochester, N.Y., assignor to Eastman Kodak Company, Rochester, N.Y., a corporation of New Jersey
Filed Feb. 6, 1964, Ser. No. 342,997
5 Claims. (Cl. 250—228)

This invention relates to light-integrating photo-responsive devices and more particularly to photoresponsive devices which can be used in small photographic and cinematographic cameras in conjunction with automatic exposure control mechanisms to condition said mechanisms in accordance with the brightness of the scene being photographed.

Combinations of photo tubes or other photoresponsive elements with light diffusing spheres have been known and used for many years in photometry to integrate and measure incident light radiations. However, the use of such light diffusing spheres is impractical in relatively small devices such as handheld cameras. Most cameras having automatic exposure control systems measure integrated scene illumination by placing a photo-sensitive element behind a plurality of light diffusing lenses which are relatively large, complex, and expensive. Some prior art devices, using recently developed, small, cadmium sulfide photo-conductive cells to monitor scene brightness, place the cells in the rear of relatively deep recesses exposed by small apertures, the light being generally diffused by the sides of the recesses prior to impinging on the cells. However, light from any object that is in direct line with the photocell is not diffused, and improper setting of the automatic exposure control mechanisms may result due to the photocell response to this unintegrated light.

The subject invention improves on prior art devices by embedding the photosensitive element of a phototransistor near the light receiving end of a relatively small and transparent acrylic resin cylinder. The photosensitive element is shielded from any direct radiation entering the light receiving end, being positioned so that it is impinged only by radiations reflected from the opposite ends of the cylinder which is coated with a reflective, light diffusing substance. While the entire device is simple, compact and relatively inexpensive, it assures integration of the light energy to which it is exposed.

Therefore, it is an object of this invention to provide an improved photoresponsive device which is simple, compact, rugged and relatively inexpensive, and which can be used in photographic and cinematographic cameras or other apparatus to integrate and measure incident light radiations.

Figure 2:
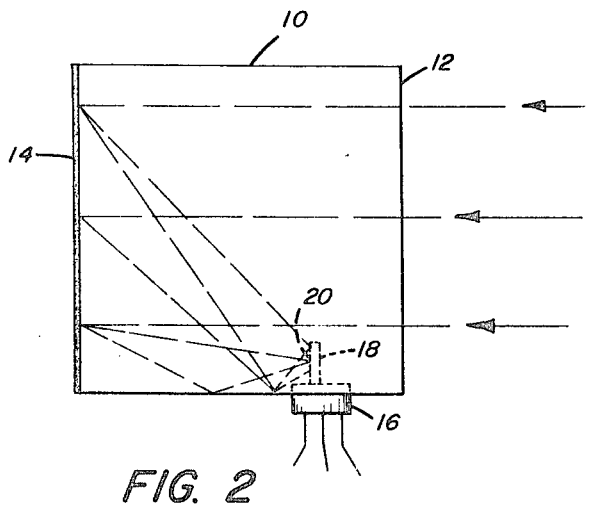

Other objects, purposes and characteristic features of the present invention will be in part obvious from the accompanying drawings, and in part pointed out as the description of the invention progresses. In describing the invention in detail, reference will be made to the accompanying drawings in which like reference characters designate corresponding parts throughout both views, and in which:

FIG. 1 is a prospective view of a photoresponsive unit according to the invention herein; and FIG. 2 is a side view of the unit illustrated in FIG. 1 showing schematically the integrating diffusion of incident light to which the unit is exposed.

Referring now to both FIGS. 1 and 2, transparent cylinder 10 has a light receiving end surface 12 and a reflective light diffusing end surface 14. Embedded in cylinder 10 near light receiving end 12 is a photo-transistor 16. Element 18 of photo-transistor 16 carries photosensitive surface 20 which is positioned inside cylinder 10 in such a manner that it can be impinged only by light energy reflected from diffusing end surface 14.

Since direct rays of incident light cannot strike photo-sensitive surface 20, photo-transistor 16 responds only to the level of incident illumination as integrated by light diffusing surface 14.

In the preferred embodiment of this invention, cylinder 10 is a transparent acrylic resin into which photo-transistor 16 is embedded. The rear end of cylinder 10 is coated with a white paint to achieve the reflective diffusing surface 14. Although the use of acrylic resin is preferred, any other transparent or translucent solid could be satisfactorily substituted therefor, and the invention could also be practiced by using a tube in the place of solid cylinder 10, in which case the inside walls of the tube should be highly reflective, while the rear end of the tube should be closed off with a light diffusing member. Also, reflecting surface 14 need not be limited to the flat vertical form shown but may be a curved surface having, for instance, spherical or parabolic characteristics.

Having described the general form of the present invention, it should be understood that the forms illustrated herein have been selected to facilitate the disclosure of the invention rather than to limit the number of forms which it may assume, and various modifications, adaptations and alterations may be applied to the form shown to meet the requirements of practice without departing from the spirit or scope of the present invention. For instance, although the foregoing description is limited to applications of the invention herein to measurements of visible light, the device may also function to integrate radiations in the infrared and ultra-violet portions of the electromagnetic energy spectrum.

What is claimed is:

1. A light-integrating photo-responsive device comprising a light-transmitting solid with a first surface exposed to incident light and a second surface having reflective, light diffusing characteristics; and a photo-sensitive element sensitive primarily to radiant energy which has been both transmitted through said first surface and diffusely reflected by said second surface.

2. The construction as defined in claim 1 wherein said light-transmitting solid is formed primarily of an acrylic resin.

3. The construction as defined in claim 1 wherein said light-transmitting solid is a cylinder having one end thereof exposed to incident light and having the opposite end thereof coated with a reflective, light-diffusing substance.

4. The construction as defined in claim 1 wherein said photo-sensitive element is imbedded in said solid.

5. A light-integrating photo-responsive device comprising a light-transmitting tubular member having a receiving end exposed to incident light and the opposite end thereof blocked with a reflective, light diffusing surface; and a photo-sensitive element positioned to be exposed only to radiant energy which has been diffusely reflected from said surface, said photo-sensitive element being mounted in proximity to the receiving end of said member.

References Cited by the Examiner
UNITED STATES PATENTS 2,952,781  9/1960  Hersh _____ 250—239
2,984,747  5/1961  Walker _____ 250—228

OTHER REFERENCES

Walker, R. C., Photoelectric Cells in Industry, Pitman, New York, 1948, page 162 relied on.

RALPH G. NILSON, *Primary Examiner.*

M. ABRAMSON, *Assistant Examiner.*